Figure 1:
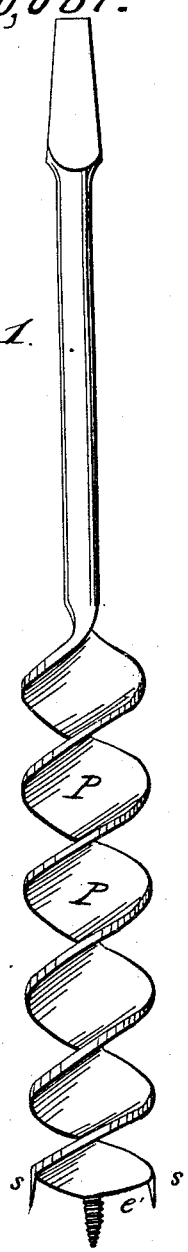
Figure 2:
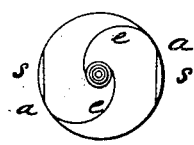
Figure 3:
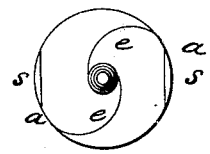
Figure 4:
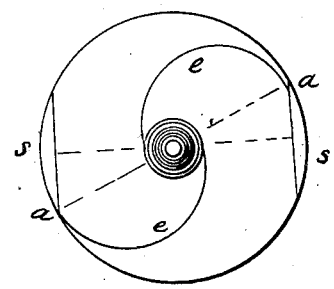

H. T. Love,
Wood Auger.

Nº 50,887.     Patented Nov. 7, 1865.

Witnesses:
J. H. Phillips
Geo C Lambright

Inventor:
Horace T. Love

UNITED STATES PATENT OFFICE.

HORACE T. LOVE, OF VERMILLION TOWNSHIP, MARSHALL COUNTY, KANS.

IMPROVEMENT IN AUGERS.

Specification forming part of Letters Patent No. 50,887, dated November 7, 1865.

*To all whom it may concern:*

Be it known that I, HORACE T. LOVE, of Vermillion township, in Marshall county, in the State of Kansas, but of the firm of HORACE W. LOVE & Co., of New York city, have invented a new and useful Improvement in the Double-Twist Auger and Auger-Bit, of which the following is a full, clear, and exact description, reference being had to the accompanying drawings, which form part of this specification, and in which—

Figure I represents a side elevation of my double-twist auger, and Fig. II and Fig. III and Fig. IV end views of the same, wherein Fig. IV is designed more particularly to show the diameter-line on which the semicircloid edge is drawn, as also the coalescence of that edge with screw and spur, which edge and its angular dispositions constitute my invention.

Augers as usually constructed are composed of three members—the cutting-bit, the screw, and the twisted pod, the latter acting to discharge the chips separated by the former, while the screw holds the edge in contact with the wood as the auger is operated, and draws the auger forward in direction of its axis as the hole is bored. The cutting-bit in double-twist augers has two floor-lips, whose cutting-edges, either in or parallel to radial lines or pointed or slightly rounded within the compass of a quadrant and less, extend from the base of the screw to the periphery of the auger, and these cutting-edges are also disposed at a right angle to the axis of the auger. Augers thus constructed are very defective—first, because the cutting-edge of the floor-lip, acting at a right angle with the axis of the auger, cuts, in boring endwise, the fibers of the wood at a right angle; and, second, in boring crosswise of the wood—as when boring through a board, for example—the cutting-edge, acting parallel with the grains of the wood, cleaves or peels up, as it were, the chips, and the result is, that in endwise boring the resistance of the wood to edge of the auger is very great, and so great in some of the hard woods that the auger, when large, cannot be made to bore, and, if made to bore at all, must have great force applied to operate it, and to the great danger of breakage, and to the utter incapability in any case of rapid motion. To remedy this defect in part the auger has been sometimes made with cutting-bit in form of a gouge; but as this form of edge cuts but a part of the fibers in endwise boring otherwise than at a right angle, the defect is at best but partially overcome, while other evils ensue not necessary here to be particularly enumerated. In crosswise boring this right-angle edge to the axis of the auger, acting to cleave or peel up the chips, as aforesaid, leaves these chips coarse and long, according to the dimensions of the hole bored, so that the chips do not pass out freely, thereby choking up the pod and compelling the auger to be frequently withdrawn to clear out the chips, and in deep boring, as in mill and ship building, rendering it almost useless. Another great defect in this auger with cutting-edges in a plane at a right angle with the axis of the auger, is the fact that the whole length of edge reaching the opposite side of the wood bored through at one and the same time is thus drawn through with lip and spur before the core of wood is completely cut out, thus leaving it to be removed roughly by moving auger to and fro, to scrape out the same with the twisted pod, or more smoothly by cutting it out with a gouge. The spurs designed to cut round the periphery of the wood to be removed, and so to make the outside of the hole smooth, contribute in this case only to make the outside of the hole jagged, as they, too, are drawn through before completing a circle after the right-angular cutting-edges appear.

Augers as usually constructed are defective still further from the fact that the cutting-edge is not only at a right angle with the axis of the auger, as aforesaid, but, secondly, from the fact that the cutting-edge is either in or parallel to a radial line from the base of the screw to the periphery of the twisted pod, or, at most, situated in a quadrant—in other words, that the edge is straight, pointed, or slightly rounded, in contradistinction from being semicircular, and herein they are defective, first, from the fact that, beginning at the screw, each successive equal measure of the radial edge has a very unequal amount of wood to cut, so resisting the cutting-power by a force whose measure increases according to the law of increase in the outer surfaces of concentric circles. To illustrate, I make a diagram as follows:

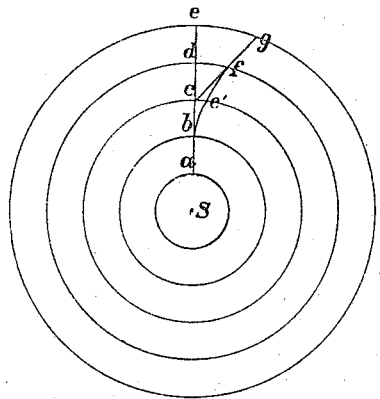

Let the circle drawn through e g represent the periphery of wood to be bored out by the cutting-edge a e, drawn in a radial line from S, the base of the screw, to e in the periphery of the cylinder, where the edge terminates, and let the radial distances a b, b c, c d, and d e be equal and represent equal measures of the edge. Now, when the edge a e acts by turning the auger, these four equal measures of edge will respectively describe the four very unequal surfaces to be cut out embraced between the concentric circles respectively drawn through the points at a, b, c, d, and e. The laws of the circle will determine how unequal are these several surfaces to be cut out thus by different but equal portions of the edge. As the inequality of surface is so evident by inspection, I need not further demonstrate; and if at the point c the cutting-edge should be constructed to g, making a c g the cutting-edge with an angle at c, or by rounding the point c and making the edge a c′ g, the defect in question is not overcome, since the cutting-edge, whether a c g or a c′ g, still remains with no regular ratio to the regular increase of surface to be cut by the respective portions of the edge represented between these concentric lines.

Another defect in the cutting-edges constructed as aforesaid arises from the fact that in operating the auger the screw perforates and the spurs cut slots in the wood to be removed, not by really detaching and lifting out the wood so displaced, but only by compressing and compacting the same into the parts contiguous, and the result is that these displaced fibers still remain to be cut out by the edge of the bit as truly as if they were originally where they are now, making in these contiguous parts a large increase of consolidated wood to be thus cut out without a corresponding additional measure of edge or other advantage in cutting.

Another defect in augers whose edge occupies in measure a quadrant and less, or even less than a semicircle, is the fact that when cutting with the grain they move easily, and therefore faster, and when cutting across the grain they move hard, and therefore more slowly, (and these conditions of cutting are found in all crosswise boring,) and the result is that inequality of force is applied in every revolution of the auger, generating a wabbling motion, and the hole is liable to be bored crooked, and not unfrequently is the pod of the auger bent or broken. These are among the more prominent defects that I propose to overcome by my invention.

My improvement consists in constructing the cutting-edges of a double-twist auger in the form of a semicircle whose radius is one-half of the radius of the base of the screw added to one-half of the radius of the auger, and these semicircular edges are disposed with reference to the axis of the auger so as to form an obtuse angle of about one hundred and twenty degrees.

The instrument, as represented in the drawings, is constructed with a double-twist pod, P, with two projecting spurs, S S, and with the side view of one edge, E, in its angular relation to the axis of the auger, the heel only of the opposite edge being presented to view in Fig. I, and with the two semicircular edges E E in Figs. II, III, and IV representing end views of the auger of different sizes. The dotted lines in Fig. IV are designed to be diameters, one drawn from the apex of the spur and the other from its cutting-base a at the point where the edges of the spur and floor-lip coalesce. In this latter line are situated the two centers on which the semicircular edges E E respectively are drawn. The angles by which the edge deflects from the base of the screw and inflects to the periphery of the auger I call respectively the angles of "deflection" and "inflection." The size of the auger being the same, the larger the base of the screw the smaller will be the angles of deflection and inflection, and the difference between these two angles relatively is determined by the difference between the radius of the auger and the radius of the base of the screw, the angle of inflection being always the smaller. The semicircloid edge is designed, therefore, to sustain a known relationship to the size of the screw and to the angles of deflection and inflection, which angles can be varied at pleasure to suit different sizes of augers, and for other reasons, without departing substantially from the principles of my invention, and which, indeed, is a part of it. Figs. II, III, and IV are designed, in part, to exhibit variations.

I. Now, as my auger is turned in the wood, in the first place the edge of the floor-lips being disposed at an obtuse angle with the axis of the auger, the following advantages ensue:

First, if boring endwise, the edge cuts the fibers of the wood obliquely, instead of cutting them at a right angle, and the resistance of the wood to the oblique cutting-edge is greatly diminished; and the increased facility with which the wood is bored by the oblique cut may be illustrated by the oblique stroke of the ax in cutting off a log compared with the stroke perpendicular to the log.

Second, if my obliquely-cutting edge is used in boring crosswise to the wood, as through a board or into the side of a stick of timber, then the edge thus disposed at an obtuse angle, instead of cleaving and peeling up, as it were, chips as long as the dimensions of the hole, cuts them longitudinally crosswise and intermediately into small fragments, and so the chips pass out of the hole freely, instead of otherwise choking the pod and compelling the auger to be withdrawn to clear the chips out.

Third, when the auger makes its appearance on the opposite side of the wood to be bored through it cannot by its own action be forced through the opposite side of the wood until the whole core has been completely cut out by the spurs, the reason whereof is that the two semicircloid edges, forming in rotating a cutting-wheel, are, in combination with their obtuse-angular disposition, resolved into a conical screw, as it were, whose threads are these edges, to prevent the auger from escaping through the wood till having made at least one full revolution, which revolution the spurs must also make, and consequently must cut completely round the core in question before the auger can pass through, and the hole is cut out smoothly to its completion.

II. The advantages in constructing the cutting-edges of the floor-lips in form of a semicircloid are—

First, that no one part of the edge $h$ may have more fibers of wood to cut than has any other one part of the edges of equal length; and, Second, since the semicircloid edge is more than twice as long as the measure of the distance from the base of the screw to the periphery of the auger, it follows that there are on an average more than two measures of the edge appropriated to cut out every one measure of wood to be cut out, and the beneficial result is that the cutting is performed after the manner of the butcher's knife, wherein it is drawn from heel toward the point across the fibers to be severed, and not after the form of a chisel, wherein the cutting-edge and the wood to be cut is in length measure for measure. Thus the whole length of my semicircloid edge from the thread of the screw, of which it is a prolongation, to periphery of the auger, where it coalesces with the edge of the spur, draws as it cuts, and that, too, besides cutting at the aforesaid oblique angle; and this drawing cut thus is not only distributed to every part of the semicircloid edge, but distributed (subject to the laws herein indicated) in an increasing ratio as the edge approaches the periphery of the auger, thus compensating, and especially in large augers, for the disadvantage at which fibers are cut at a distance from the screw. Other things being equal, it requires much more force to cut a fiber at one inch than at a quarter of an inch from the screw. The regular ratio required to compensate obtains only in the semicircloid edge.

Third, by the angles of deflection and inflection, to be diminished and increased at pleasure, according to a known fixed law, extra length of edge is provided and appropriated for the extra cutting of the compacted wood contiguous to the aforesaid perforations of the screw and the slot of the spurs, while in very large augers a quantity beyond the adjustable allotment, and in very small augers short of the adjustable allotment, can by the same law be appropriated.

Fourth, in operation, the two semicircloid edges being equivalent to the cutting-edges of a revolving wheel, they consequently are cutting at one and the same time lengthwise, crosswise, and intermediately in each and every part of the cylinder, and the result is no inequality of force to operate is required, and no wabbling, with its attendant evils, ensues.

Thus I have an auger of great efficiency to bore any woods, hard or soft, endwise, crosswise, or intermediately, and at any depth to bore easily and rapidly, and smoothly, and in a straight line, with no danger of choking up, and none, therefore, of bending and breaking, having no need of withdrawing to clean out the chips, and no wabbling motion, and leaving no cutting out of cores to be done. It will hold its edge long, because it has a long edge to hold. Its edges, constructed on a semicircle, with angles of deflection and inflection, for adjustment to all sizes of augers, and for other purposes, and edges disposed at an obtuse angle to its axis, my auger is essentially different in principle as well as in practice from the gouge-bit, or from the edge straight, rounded, or pointed, disposed, as they are, at right angles to the axis of the auger, and occupying, as they do, the space of a quadrant or less in its periphery.

From imperfection in machinery and otherwise, I do not confine myself to mathematical exactitudes in construction so long as the principle is not thereby essentially changed; and I not claim the rounded edge shown but not claimed by W. A. Ives in his model for patent of August 28, 1860, nor the same shown in Plate 35, part first, of the Technological Dictionary of Techtt, nor the same in the twice-rejected application of Crossman and Richardson, filed January 18, 1853, these being all substantially the same, and the edge so constructed by them being in the form substantially elliptical with the focus at the center of the screw. Said edge meets the periphery of the auger nearly perpendicular to a line drawn tangent to the periphery at that point, and consequently said edge, though rounded, is nevertheless diametrically opposite in principle to the cutting of my auger, both as to the quantity of wood to be cut by a given measure of the edge and as to the drawing of the cut, by which the fibers of the wood are severed, and also as to the ratios secured by my angles of deflection and inflection.

I also disclaim the obtuse angle at which my cutting-edge is disposed in its relation to the axis of the auger, except as it operates in combination with the circloid edges.

What I claim as my invention, and desire to secure by Letters Patent, is—

The semicircloid edges, the angles of deflection and inflection in disposing these edges in their relation to screw and periphery of the auger, and the combination of these edges with an obtuse-angular disposition of them in their relation to the axis of the auger, as and for the purposes substantially set forth in the foregoing specification.

Hardware house of Horace W. Love & Co., New York, August 1, 1865.

HORACE T. LOVE.

Witnesses:
 JNO. H. NICOLAY,
 WM. VAN VLECK.